United States Patent [19]

Lo et al.

[11] 3,904,703

[45] Sept. 9, 1975

[54] DEHYDROGENATION PROCESS

[75] Inventors: Ching-Tsan Lo; Joe Jed Miller; Norbert Francis Cywinski, all of Odessa, Tex.

[73] Assignee: El Paso Products Company, Odessa, Tex.

[22] Filed: Apr. 9, 1973

[21] Appl. No.: 349,326

[52] U.S. Cl......... 260/669 R; 260/680 R; 260/683.3
[51] Int. Cl.²........................................... C07C 5/18
[58] Field of Search.......... 260/680 E, 669 R, 683.3

[56] References Cited
UNITED STATES PATENTS

| | | | |
|---|---|---|---|
| 3,161,670 | 12/1964 | Adams et al. | 260/680 E |
| 3,375,291 | 3/1968 | Callahan et al. | 260/680 E |
| 3,686,346 | 8/1972 | Pitzer | 260/680 E |
| 3,725,493 | 4/1973 | Stine | 260/680 E |
| 3,725,494 | 4/1973 | Ripley | 260/680 E |
| 3,737,473 | 6/1973 | Ripley | 260/680 E |
| 3,763,258 | 10/1973 | Cohen | 260/680 E |

Primary Examiner—Paul M. Coughlan, Jr.
Attorney, Agent, or Firm—Depaoli & O'Brien

[57] ABSTRACT

A novel reactor system and method for conducting dehydrogenation/oxidation reactions such as the dehydrogenation of hydrocarbons to form olefins and/or diolefins, comprising contacting the feed to be reacted in a sequence involving a dehydrogenation catalyst in a first zone, an oxidation or reducible catalyst in a second zone and with an adsorbent in a third zone, said zones being in a single reactor or series of reactors.

13 Claims, 1 Drawing Figure

PATENTED SEP 9 1975　　3,904,703
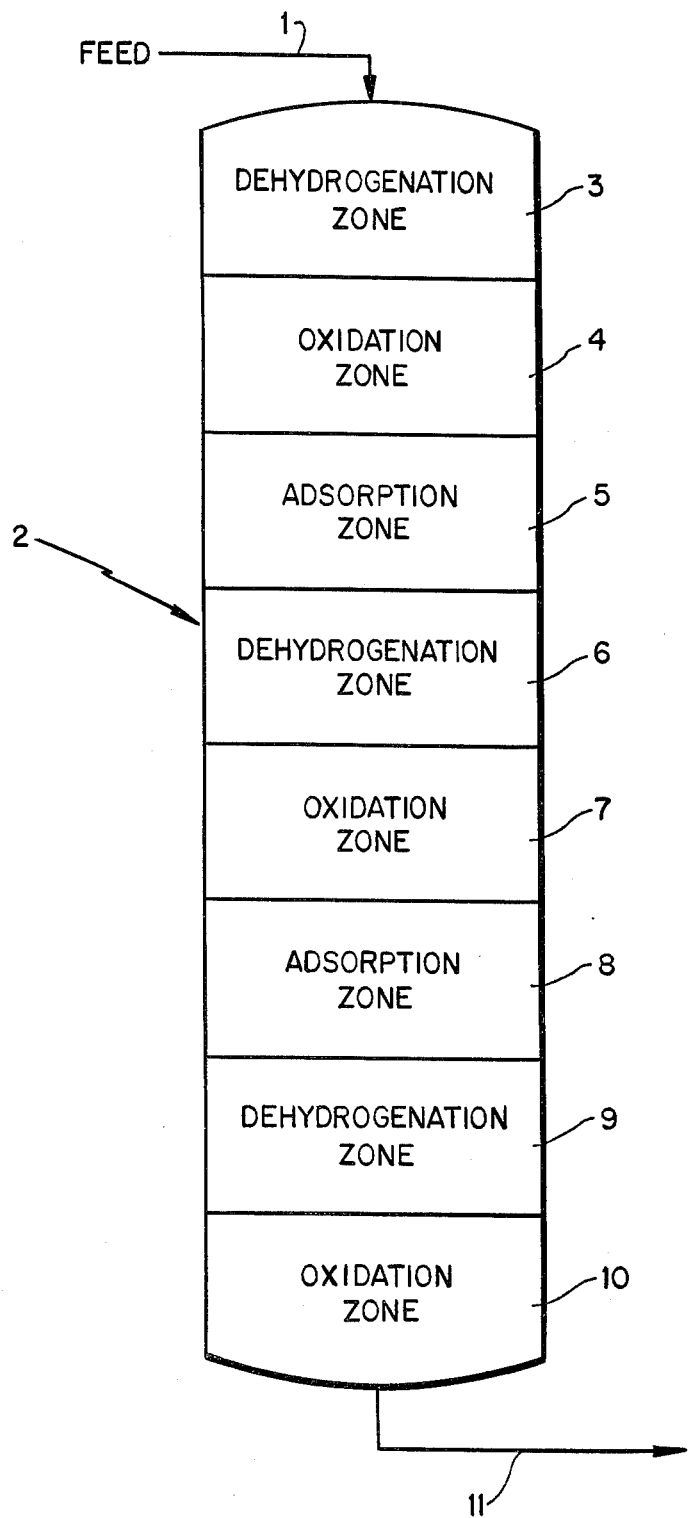

DEHYDROGENATION PROCESS

BACKGROUND OF THE INVENTION

1. Field of the Invention

This invention relates to an improved reactor system arrangement and method for conducting reactions using dehydrogenation and oxidation catalysts such as the dehydrogenation of hydrocarbons to form olefins and/or diolefins. More particularly, this invention concerns the use of a novel reactor system and method for improving the conversion of a dehydrogenation process and the selective recovery of olefins and/or diolefins.

2. Description of the Prior Art

There are known a number of reactions which require the use of a combination of a dehydrogenation and oxidation catalysts. One such reaction involves the dehydrogenation of hydrocarbons to form olefins and/or diolefins, high temperature and vacuum operation are usually necessary or desirable in order to obtain favorable thermodynamic equilibria. In this reaction, vacuum operation requires that the effluent gases from the reactor be compressed to atmospheric pressure or higher before the products are purified and recovered. Thus, the yields of olefins and/or diolefins per pass in most units are limited by the thermodynamics and also by the capacity of the compressors to compress the large amounts of hydrogen and other light hydrocarbons back to atmospheric pressure. One alternative to this practice, as disclosed in the prior art, is to use a conventional dehydrogenation catalyst in conjunction with an oxidation catalyst. See for example, U.S. Pat. No. 3,161,670 and U.S. Pat. No. 3,488,402. The function of the oxidation catalyst in this system is to convert the hydrogen produced in the dehydrogenation reaction into water and shift the thermodynamic equilibrium. To the present, the most active conventional dehydrogenation catalyst used in commercial production is chromia-alumina which will be poisoned by water when generated in the reaction. If one does not properly arrange the catalysts, the combination of a dehydrogenation catalyst and an oxidation catalyst is not satisfactory for conducting the dehydrogenation process as it may be deleterious to the process. Accordingly, a need remains in the art for a reactor arrangement and method by which this process can be conducted with good conversions and selectivities. The present invention meets this need and also provides a reactor system of broad utility where both dehydrogenation and oxidation catalysts are required.

SUMMARY OF THE INVENTION

It is accordingly one object of this invention to provide a reactor system or arrangement for use in systems requiring dehydrogenation and oxidation catalysts which overcomes or otherwise mitigates the problems of the prior art.

A further object of the invention is to provide a novel three-zone reactor system and method found particularly applicable to the dehydrogenation of hydrocarbons to form olefins and/or diolefins.

A still further object of the invention is to provide a novel reactor and method in conducting the dehydrogenation of hydrocarbons to form olefins and/or diolefins by a sequence involving initial contact with a dehydrogenation catalyst followed by contact with an oxidation or reducible catalyst followed by contact with an adsorbent.

Other objects and advantages of the present invention will become apparent as the description proceeds.

In satisfaction of the foregoing objects and advantages, there is provided by this invention a reactor system and method especially suitable for treating a hydrocarbon feedstock such as in the dehydrogenation of hydrocarbons, e.g., paraffins, to form olefins and/or diolefins by the steps comprising contacting said feedstock in a sequence comprising a dehydrogenation catalyst in a first zone, then in a second zone with an oxidation or reducible catalyst and then in a third zone with an adsorbent. The sequence may be repeated as many times as desired depending on the space in the reactor or reactors. Also provided is a single reactor containing this novel arrangement of catalysts and adsorbents in separate zones or a series of reactors containing these zones in sequence.

BRIEF DESCRIPTION OF THE DRAWING

Reference is now made to the drawing accompanying this application which illustrates one embodiment of a reactor system or arrangement.

DESCRIPTION OF THE PREFERRED EMBODIMENTS

As indicated above, the prior art is aware of processes for use of combination dehydrogenation and oxidation catalyst systems. One such process is the dehydrogenation of hydrocarbons which comprises initial contact of the hydrocarbons, with a dehydrogenation catalyst followed by contact with an oxidation or reducible catalyst.

The above-mentioned U.S. Pat. Nos. 3,161,670 and 3,448,402 are exemplary of this procedure. A number of problems have developed in conducting this process, however, which problems particularly involve the arrangement of the catalysts within the reactor. Thus, if the oxidation catalyst is uniformly dispersed throughout the reactor, water will be produced everywhere in the reactor. Because water is deleterious to the dehydrogenation catalyst, the activity of the dehydrogenation catalyst, usually chromia-alumina, will be seriously reduced. One procedure devised for overcoming this problem has been to use a uniform reactor bed consisting of both dehydrogenation catalyst and oxidation catalyst but this has not been found to provide better results than the dehydrogenation catalyst bed alone.

As the art has progressed in this area, it has been found that the oxidation catalyst is better separated from the dehydrogenation catalyst. Usually, the dehydrogenation catalyst is followed by the oxidation catalyst. However, if the oxidation catalyst is not followed by another layer of the dehydrogenation catalyst to utilize the thermodynamic equilibrium favor, the gain from using the oxidation catalyst is limited. Also, from the heat balance viewpoint, it is better to have a reactor which can accommodate several layers of catalyst in which the dehydrogenation catalyst and the oxidation catalyst are alternatively located. Because the dehydrogenation reaction is an endothermic reaction and the oxidation is exothermic, if there are only two layers, i.e. dehydrogenation at the top and oxidation on the bottom, the upper layer will be too cold and the lower layer too hot as the process proceeds. A multi-layered reactor solves the heat problem partially. However, if an oxidation catalyst layer is followed by a dehydrogenation catalyst layer immediately, the reactor will have the same problems as a reactor in which the oxidation catalyst is uniformly dispersed would have, that is, the water produced in the oxidation layer will be deleterious to the next dehydrogenation catalyst. Thus, the catalyst bed still does not perform to expectations.

In accordance with this invention, it has been found that between an oxidation layer and the next dehydrogenation layer, better results are achieved if there is inserted an adsorption layer to adsorb the produced steam. In other words, a better arrangement of a reactor for conducting the dehydrogenation of hydrocarbons using dehydrogenation/oxidation catalyst systems is to use the sequence; dehydrogenation catalyst - oxidation catalyst - adsorbent - dehydrogenation catalyst - etc., as long as the space of the reactor allows.

The invention may be better understood by reference to the drawing where there is shown a suitable reactor for conducting the process. In the drawing a typical reactor is shown which contains multiple zones in the sequence described herein. Thus, the hydrocarbons are fed into reactor 2 via line 1 after preheating, if desired. In reactor 2, zones 3, 6 and 9 contain dehydrogenation catalyst, zones 4, 7 and 10 contain an oxidation or reducible catalyst and zones 5 and 8 contain the adsorbent. The feed passes through these zones under the conditions described herein to effect the conversion and exits via line 11 for recovery of the olefin and diolefin products as by fractionation. The adsorbent layer is necessary to protect the following dehydrogenation catalyst so that it is not necessary to provide an adsorbent as the last step in the sequence. The steam evolved in the last sequence is removed in the following quench tower or other purification step.

As will be seen, this reactor illustrates the use of three separate regions for each section or zone of catalyst or adsorbent. Obviously, the reactor may be operated with two, three, four or more combinations of the sequence, (1) dehydrogenation catalyst zone, (2) oxidation or reducible catalyst zone, and (3) adsorbent zone, depending on the size of the reactor used. It is to be appreciated, however, that each of these zones may comprise one or more separate reactors.

The thickness of each layer of catalyst or adsorbent can vary widely depending on the operating conditions and the conversion and selectivity desired. Each layer should not be so thick as to create a heat balance problem, however, or too thin to react sufficiently in each layer. Usually the thickness of each layer will range from about 0.1 inches to 5 feet, preferably from about one inch to one foot.

As pointed out above, the reaction system is considered applicable to any process involving use of both dehydrogenation and oxidation catalysts. However, the invention is particularly applicable to the dehydrogenation of hydrocarbons and will be described with special reference to this reaction. In this reaction the starting materials or hydrocarbons generally comprise those containing at least one aliphatic chain of two to about twenty or more carbon atoms, individually or in a mixture. The process of the invention is particularly suitable for the lower hydrocarbons, that is, those containing about two to six carbon atoms, especially the $C_2$ to $C_6$ paraffins. Thus, suitable feeds comprise ethane, propane, n-butane, isobutane, isopentane or other individual hydrocarbon fractions available in a petroleum refinery to mixed hydrocarbon fractions comprising 30 volume percent, preferably 50 volume percent or more paraffins. The feeds are usually nonacetylenic and often are saturated or olefinically unsaturated hydrocarbons.

In the first zone of the reactor, this feed is contacted with a dehydrogenation catalyst which can be any of the conventional catalysts usually employed for this reaction. Catalysts of this type include alumina, magnesia, or a combination thereof, which may be promoted up to about 40% of an oxide of a metal of Group IV-B, V-B or VI-B of the Periodic Table of the Elements as presented at pages 392–393 of the "Handbook of Chemistry and Physics," 35th edition, 1953–1954. Specific examples of such catalysts include alumina promoted with about 40% of any of chromium oxide, zirconium oxide and titanium oxide; magnesia promoted either with about 20% molybdenum oxide or about 40% zirconium oxide; magnesia-alumina promoted with about 20% vanadium oxide; and unsupported active chromium oxide. A particularly effective catalytic composition for dehydrogenating paraffin hydrocarbons is chromia-alumina.

The catalyst in the oxidation or reducible catalyst zone may be any of the catalysts of this type known to the art. Preferred catalysts are for example those described in U.S. Pat. No. 3,488,402 which comprise the vanadates, molybdates, phosphomolybdates, tungstates and phosphotungstates of Group IV-A and V-A metals such as bismuth, arsenic, antimony, tin, etc. In all of these catalysts, the metals are in combination with oxygen, the amount of combined oxygen being dependent upon the oxidation-reduction potential of the environment during their use. A preferred catalyst is bismuth vanadate, in which up to about 50% of the bismuth may be substituted with other Group IV-A and V-A metals. During use, the bismuth vanadate is reduced to a lower valence state, but upon regeneration the active, higher valence form of the catalyst is regained.

A highly preferred class of oxidation catalysts includes the vanadates and molybdates of Group IV-A and V-A metals promoted by a compound of Group V-B, VI-B and/or VIII of the Periodic Table of the Elements as presented at pages 392–393 of the "Handbook of Chemistry and Physics," 35th edition. Thus, these catalysts preferably comprise vanadates and/or molybdates of metals of Group IV-A (germanium, tin or lead) or Group V-A (antimony or bismuth), promoted by a compound or Element of Group V-B (vanadium, niobium or tantalum), Group VI-B (chromium, molybdenum or tungsten), or Group VIII (iron, cobalt, nickel, ruthenium, rhodium, palladium, osmium, iridium or platinum). Highly preferred catalysts within this broad grouping are bismuth vanadate and bismuth molybdate promoted by palladium. Catalyst mixtures may also be used.

The atomic ratio of vanadium and/or molybdenum content to the Group IV-A and/or Group V-A metal content should be in the range of 0.05 to 50, preferably 0.2 to 5. The promoter (Group V-B, VI-B and/or Group VIII) content should be in the range of 0.02 to 50 weight percent of the base oxidation catalyst, preferably 0.1 to 20 weight percent. In all of these catalysts, the metals are in combination with oxygen, the amount of combined oxygen being dependent upon the oxidation-reduction potential of the environment during their use. The oxygen is released during dehydrogenation of the hydrocarbons and is restored during the air regeneration phase.

These last-mentioned oxidation catalysts are disclosed and claimed as novel in our copending patent application Ser. No. 349,328, filed Apr. 9, 1973. The disclosure of that copending application is hereby incorporated by reference.

The adsorbents used in the adsorbent zone can be any of the well-known adsorbents which are effective in adsorbing the steam generated in the reaction. Suitable adsorbents are alumina, magnesia, silica gel or mixtures thereof. Obviously, equivalent adsorbents may be used.

The dehydrogenation process is conducted under reactor conditions including an elevated temperature, for instance, about 800° to 1,250°F., preferably about 950° to 1,150°F. The pressure may vary from about 0.1 to 0.8 atmospheric pressure, preferably 0.1 to 0.5 atmospheric pressure and the contact time or liquid hourly space velocity (LHSV) which may be dependent upon the catalyst, temperature and pressure employed, will generally range from about 0.1 to 10 seconds or more, preferably about one-fifth to five LHSV based on the liquid volume of hydrocarbon per volume of catalyst per hour. The dehydrogenation cycle time may vary from about 1 to 30 minutes, preferably 5 to 20 minutes. The regeneration time which would be dependent upon the dehydrogenation time and the operation conditions may vary about 1 to 60 minutes or longer, preferably about the same length of time as the dehydrogenation. These conditions are maintained in both steps of the process.

In the method of the invention, the hydrocarbons are selectively converted to olefins and/or diolefins in good yield using this three zone catalyst system. In the first zone, the hydrocarbons are converted by contact with the dehydrogenation catalyst, e.g., chromia-alumina. In the second step, the resulting product mixture is contacted with the oxidation or reducible catalyst system and the adsorbent following each oxidation catalyst adsorbs the steam. Use of the novel catalyst arrangement or system has been found to result in improved conversions and selectivity to the desired products. No air is added to this system since the oxidation catalyst usually serves as the oxygen source during the reduction. Since the dehydrogenation process is a cyclic process in which the conventional dehydrogenation catalyst can be periodically regenerated with air, the oxidation catalyst can be reoxidized to its original state during the regeneration phase. The use of this catalyst system and arrangement enables the obtaining of higher yields of diolefins per pass with no increase in load on the compressors. Another feature that this system offers is that it is possible to operate conventional dehydrogenation units at higher pressure and still obtain the same amount of diolefins in the effluent gas. Since vacuum operation is expensive, the present process advantageously either reduces the size of the compressor needed or greatly increases the capacity of the existing compressors. Moreover, by this system the selectivity to desired products is increased.

The following examples are presented to illustrate the invention but is not to be considered as limited thereto. In the examples and throughout the specification, parts are by weight unless otherwise indicated.

EXAMPLE I

A bismuth vanadate catalyst was prepared by dissolving 480 grams of bismuth nitrate in 800 ml (80 ml of concentrated $HNO_3$ + 720 ml $H_2O$) and separately stirring 90 grams of vanadium pentaoxide in 1,000 ml of deionized water. The bismuth nitrate solution was added to the stirred suspension of vanadium pentaoxide. The temperature of the suspension was maintained at about 160° to 170°F. during the addition. The mixture was neutralized to a pH of 7.5 by adding aqueous ammonia. The slurry was filtered, washed and then dried in a vacuum oven. The dried catalyst was then pelleted to one-fourth inch size. The catalyst has an atomic ratio of bismuth to vanadium about 1:1.

EXAMPLE II

Forty-nine grams (20 ml) of the prepared catalyst of Example I was uniformly mixed with 121 grams (80 ml) of a commercial n-butane dehydrogenation catalyst which contained 30 wt. percent of chromia-alumina catalyst (Houdry Type C catalyst) and 70 wt. percent of alumina inert. The uniformly mixed catalyst was charged to a reactor which was used for dehydrogenation of n-butane at atmospheric pressure. The partial pressure of n-butane was reduced by dilution with four volumes of nitrogen. The liquid hourly space velocity was 0.45 (n-butane only). The process was cyclic. Results of a typical cycle at 560°C were at follows:

TABLE I

|  | 1 min. | 3 min. |
|---|---|---|
| Conversion of n-butane mol percent | 22.10 | 20.02 |
| Selectivity to butadiene mol percent | 30.78 | 31.17 |
| Selectivity to butenes plus butadiene mol percent | 77.14 | 77.16 |
| Butadiene yield moles of butadiene/100 moles of n-butane | 6.80 | 6.24 |

EXAMPLE III

Sixty-one grams (about 30 ml) of the prepared catalyst, 47 grams (about 45 ml) of chromia-alumina catalyst (Houdry Type C catalyst) and 75 grams (about 40 ml) of alumina inert were charged to a reactor in the following arrangement: from top to bottom, 15 ml of chromia-alumina - 10 ml of the prepared catalyst - 20 ml of alumina inert - 15 ml of chromia-alumina catalyst - 10 ml of the prepared catalyst - 20 ml of alumina inert - 15 ml of chromia-alumina catalyst - 10 ml of the prepared catalyst. The reactor was used for the dehydrogenation of n-butane at atmospheric pressure. The partial pressure of the hydrocarbons was reduced by dilution with 4 volumes of nitrogen. The liquid hourly space velocity was 0.45 (n-butane only). Results of a typical cycle at 560°C. were as follows:

TABLE II

|  | 1 min. | 3 min. | 5 min. | 10 min. |
|---|---|---|---|---|
| Conversion of n-butane, mol percent | 60.69 | 58.51 | 56.22 | 47.39 |
| Selectivity to butadiene, mol percent | 37.62 | 37.35 | 37.75 | 36.88 |
| Selectivity to butenes and butadiene, mol percent | 84.45 | 84.23 | 80.14 | 75.76 |
| Butadiene yield, moles of butadiene/ | | | | |

TABLE II-continued

|  | 1 min. | 3 min. | 5 min. | 10 min. |
|---|---|---|---|---|
| 100 moles of n-butane | 22.83 | 21.85 | 21.22 | 17.48 |

From a comparison of the results of Table I and Table II, it is obvious that a reactor with the arrangement of Example III performed better than a reactor with uniformly mixed bed of Example II.

The invention has been described herein by reference to certain preferred embodiments. However, as obvious variations thereon will become apparent to those skilled in the art the invention is not to be considered as limited thereto.

We claim:

1. In a method for conducting a dehydrogenation reaction involving contact of a hydrocarbon feedstock with sequences of dehydrogenation catalyst and reducible oxidation catalyst in mutually exclusive zones, the improvement which comprises separating adjacent sequences of catalyst zones with a zone of steam adsorbent.

2. A method according to claim 1 wherein the feedstock is a hydrocarbon containing at least one aliphatic chain of about 2 to 20 carbon atoms.

3. A method according to claim 1 wherein the reaction is conducted at a temperature of about 800°–1,250°F., and a pressure of from about 0.1 up to 0.8 atmosphere.

4. A method according to claim 1 wherein contact time of the hydrocarbons with the catalyst is about 0.1 to 10 seconds.

5. A method according to claim 1 wherein the dehydrogenation catalyst is alumina or magnesia promoted with up to 40% by weight of an oxide of Group IV-B, V-B or VI-B of the Periodic Table.

6. A method according to claim 1 wherein the adsorbent is alumina, magnesia or silica gel.

7. A method according to claim 1 wherein the reducible oxidation catalyst is a vanadate, molybdate, phosphomolybdate, tungstate or phosphotungstate of Group IV-A or V-A metal promoted by a compound of Group V-B, VI-B or VIII of the Periodic Table.

8. A method according to claim 7 wherein the oxidation catalayst is a vanadate or molybdate of germanium, tin, lead, antimony or bismuth promoted by a compound of vanadium, niobium, tantalum, chromium, molybdenum, tungsten, iron, cobalt, nickel, ruthenium, rhodium, palladium, osmium, iridium or platinum.

9. A method according to claim 8 wherein the oxidation catalyst is bismuth vanadate promoted by a compound of palladium, chromium or platinum.

10. A method according to claim 9 wherein the feedstock comprises paraffins, olefins or alkylated aromatics.

11. A method according to claim 10 wherein the feedstock is ethane, propane, butane, isobutane, pentane, isopentane, hexane or mixture thereof.

12. A method according to claim 10 wherein the feedstock comprises butylenes, pentenes, isopentenes, hexenes or mixture thereof.

13. A method according to claim 10 wherein the feedstock is ethylbenzene.

\* \* \* \* \*